United States Patent
Houldey et al.

(10) Patent No.: US 7,458,289 B2
(45) Date of Patent: Dec. 2, 2008

(54) SENSOR SYSTEM FOR AN PIPELINE INSPECTION TOOL

(75) Inventors: Peter Houldey, County Durham (GB); Christopher Envy, Newcastle (GB)

(73) Assignee: PII Limited, Cramlington (GB)

( * ) Notice: Subject to any disclaimer, the term of this patent is extended or adjusted under 35 U.S.C. 154(b) by 180 days.

(21) Appl. No.: 11/377,929

(22) Filed: Mar. 17, 2006

(65) Prior Publication Data
US 2006/0248966 A1 Nov. 9, 2006

(30) Foreign Application Priority Data
Mar. 17, 2005 (GB) .................................. 0505506.6

(51) Int. Cl.
G01D 11/30 (2006.01)
G01M 19/00 (2006.01)
G01N 27/82 (2006.01)

(52) U.S. Cl. ........................ 73/865.8; 73/431; 324/219; 324/220

(58) Field of Classification Search .................... 73/431, 73/855, 865.8; 15/104.03, 104.05–104.063, 15/104.09–104.2; 324/219–221
See application file for complete search history.

(56) References Cited

U.S. PATENT DOCUMENTS

| | | | |
|---|---|---|---|
| 3,460,028 A * | 8/1969 | Beaver et al. ................ | 324/220 |
| 3,973,441 A * | 8/1976 | Porter ........................ | 73/866.5 |
| 4,098,126 A * | 7/1978 | Howard ....................... | 73/865.8 |
| 4,105,972 A | 8/1978 | Smith | |
| 4,538,316 A * | 9/1985 | Reinhart et al. .......... | 15/104.061 |
| 6,847,207 B1 * | 1/2005 | Veach et al. ................. | 324/220 |
| 6,848,313 B2 * | 2/2005 | Krieg et al. ................... | 73/628 |
| 7,178,418 B2 * | 2/2007 | Richter et al. .............. | 73/866.5 |
| 2003/0183022 A1 | 10/2003 | Sapelnikov et al. | |
| 2006/0220640 A1 * | 10/2006 | Thompson et al. .......... | 324/220 |

FOREIGN PATENT DOCUMENTS

| | | |
|---|---|---|
| EP | 0 523 880 A1 | 1/1993 |
| GB | 2 386 660 A | 9/2003 |
| GB | 2 415 761 A | 1/2006 |
| JP | 3-25364 | 2/1991 |
| WO | WO 02/29312 A2 | 4/2002 |
| WO | WO 2006003392 A1 * | 1/2006 |

* cited by examiner

Primary Examiner—David A. Rogers
(74) Attorney, Agent, or Firm—Stites & Harbison PLLC; Ross F. Hunt, Jr.

(57) ABSTRACT

An in-line pipe inspection tool has a sensor carrier carrying a plurality of sensor for monitoring the pipe. In order to permit the sensor carrier and hence the sensors, to conform to changes in the diameter of the pipe being inspected, the sensor carrier is a part cylindrical body which is resiliently flexible. However, to stop one part of the sensor carrier twisting torsionally relative to another part, a bracing unit is fixed to one part the sensor carrier and engages another part of the sensor carrier to resist said torsional twisting.

13 Claims, 8 Drawing Sheets

SENSOR SYSTEM FOR AN PIPELINE INSPECTION TOOL

BACKGROUND OF THE INVENTION

1. Field of the Invention

The present invention relates to a sensor system for an in-line pipe inspection tool. Such an in-line pipe inspection tool is also known as a pipeline pig.

2. Summary of the Prior Art

It is known to inspect a pipeline from the inside using a pipeline pig which passes down the pipe. For magnetic inspection, the pig has permanent magnets defining pole pieces, which are positioned adjacent to the inner wall of the pipe. Those magnets then generate magnetic fields which magnetise the wall of the pipe. Sensors are provided between the magnetic poles, which detect the magnetic flux density at the internal surface of the pipe. The magnetic field in the pipe wall is normally constant, but is disturbed by a flux changing feature, such as a defect, weld bead or wall thickness change, and magnetic flux then leaks out of the pipe at such a feature, to be detected by the sensors. As the pipeline pig is driven along the pipe, the location of the pole pieces, and the sensors, moves along the pipe enabling the internal surface of the pipe to be inspected.

In known arrangements, the sensors may be mounted directly to the body of the pig, but it is more usual to mount them on a sensor carrier, which may also carry the pole pieces of the magnetic pole, and which sensor carrier is connected to the body of the pig by a deformable linkage. Such a deformable linkage permits the sensor carrier to move radially, to allow it to pass e.g. a deformation in the pipe. Thus, the sensor carrier usually forms a body conforming to part of the circumference of a cylinder, and the sensors are mounted on the carrier so as to extend around the circumference of the part-cylinder. Thus, as the pipeline pig moves along the pipeline, the sensors sense an arc of the pipeline, at a given position along the pipeline. Normally, a plurality of such sensor carriers, each with a plurality of sensors, are provided on the pipeline pig, so that the whole circumference of the pipeline can be sensed.

In the known arrangements, the sensor carrier is rigid. This means that it can only be used successfully with pipelines of specific diameters, corresponding to the radius of curvature of the part-cylindrical body of the sensor carrier, as otherwise some of the sensors would not be sufficiently close to the wall of the pipeline.

SUMMARY OF THE INVENTION

However, it is desirable that pipeline pigs may be used in pipelines of a range of diameters, and therefore the present invention proposes that the sensor carrier is flexible, such that its radius of curvature may vary. Thus, by the flexing of the part-cylindrical body of the sensor carrier, the radius of the cylinder changes, and thus the sensor carrier, and hence the sensors which it carries, can conform to pipelines of different diameters.

However, it has been appreciated that if the sensor carrier is sufficiently flexible that its radius of curvature may vary, it is also sufficiently flexible to twist under torsion. Forces may be applied to the sensor carrier which would cause a line along the surface of the sensor carrier parallel to the axis of the cylinder to twist so that such a line is no longer parallel to the cylinder axis. Such deformation would again cause unsuccessful operation of the sensors, since the angle of the sensors relative to the inner wall of the pipeline would vary along the sensor carrier. Therefore, the present invention also provides a bracing unit for resisting such twisting.

Thus, at its most general, the present invention proposes a sensor module for an in-line pipe inspection tool (pipeline pig) having a flexible sensor carrier, the radius of curvature of which is variable, and a bracing unit which resists torsional twisting of one part of the sensor carrier relative to another.

Thus, the present invention may provide a sensor module for an in-line pipe inspection tool, comprising:

a sensor carrier carrying a plurality of sensors, the sensor carrier being a part-cylindrical body, the part corresponding to part of the circumference of the cylinder, and being resiliently flexible such that the radius of curvature relative to the central axis of the cylinder, is variable; and a braced unit fixed to a part of the sensor carrier and engaging at least one other part of the sensor carrier, the engagement being such as to resist deformation of said other part of the sensor carrier, which deformation is such as to cause the surface of said other part of said sensor carrier to be inclined relative to the central axis of the cylinder.

Preferably, the bracing unit is fixed to a central part of the sensor carrier, and engages two parts of the sensor carrier on opposite sides of that centre, those parts preferably being at, adjacent or towards the lateral edges of the sensor carrier. Thus, as the sensor carrier flexes to change its radius of curvature, the parts of the sensor carrier towards lateral edges are braced relative to its central part so that the lateral edges do not twist significantly relative to the central part, and the sensor carrier is thus maintained in a part-cylindrical shape.

In the present invention, the bracing unit must resist the twisting of the sensor carrier, but must permit the sensor carrier to flex resiliently to change radius. Whilst it would be possible for the bracing unit to have a rigid structure, but have the engagement of the bracing unit with the sensor carrier being radially moveable, it is preferable the bracing unit itself is capable of deforming to conform to the change in the radius and curvature of the sensor carrier. However, if the bracing unit is to perform its function, it must not itself be capable of twisting torsionally. In order to achieve this, it is preferable for the bracing unit to be formed by parts hingedly connected together. Thus, where the bracing unit is fixed to central part of the sensor carrier, and engages peripheral parts, the bracing unit may have two parts (which may themselves be curved) extending between its centre and its periphery, which rigid parts are hingedly connected together to permit the bracing unit to deform consequent on changes of radius of the sensor carrier.

Preferably, the bracing unit engages the sensor carrier at its leading and trailing edges (i.e. the edges corresponding to the ends of the cylinder), so that such engagement may be clear of the mounting of the sensors on the sensor carrier. However, when the sensor carrier flexes, to change its radius of curvature, it will normally be necessary for the point or points of engagement of the bracing unit to move slightly, relative to the sensor carrier to permit such flexing. For example, the bracing unit may engage the leading and/or trailing edges so as to be slidable along those edges around the circumference of the part-cylinder.

In the development of the present invention, the sensor module is mounted on the in-line pipeline inspection tool via a deformable linkage which permits the sensor carrier to move radially relative to the body of the tool such as a parallelogram linkage. Moreover, it is also desirable that the sensors themselves move relative to the sensor carrier, and thus may be connected to the sensor carrier via a deformable linkage, again using e.g. a parallelogram linkage.

Normally, as in the known arrangements, a plurality of sensor modules according to the present invention will be provided circumferentially around the body of a pipeline pig.

Moreover, although the present application has been described in the context of the sensor module, the present invention also relates to a pipeline pig having at least one, preferably a plurality, of such sensor modules.

BRIEF DESCRIPTION OF THE DRAWINGS

An embodiment of the present invention will now be described in detail, by way of example, with reference to the accompanying drawings, in which.

DETAILED DESCRIPTION

Figure 1:
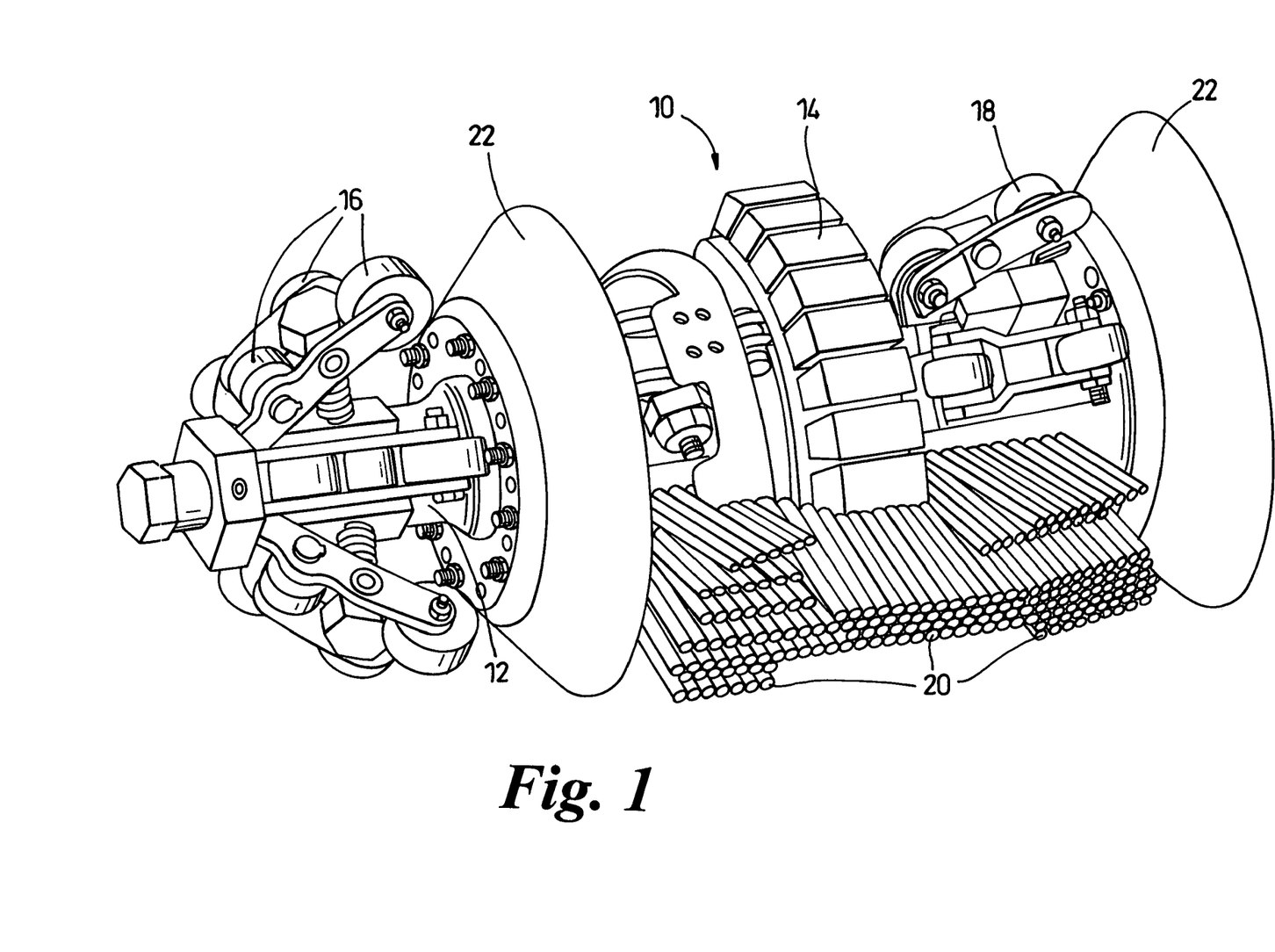
FIG. 1 shows part of a pipeline pig having a sensor module according to an embodiment of the invention.

Referring first to FIG. 1, a vehicle 10 being a part of an in-line pipe inspection tool (pipeline pig) has a body 12 carrying a sensor module 14 which is to sense magnetic fields in the wall of the pipeline along which the pipeline pig passes. The vehicle 10 also has wheels 16, 18 which can bear against the inside wall of the pipe, when the pipeline pig is moving along the pipe, so as to cause the body 12 to be positioned on or near the central axis of the pipe. The sensor module 14 is then located immediately adjacent to the internal surface of the pipeline to enable the sensors (to be discussed later) which are mounted on that sensor module 14 to sense changes in magnetic fields in the pipeline. Those magnetic fields are generated by magnets which form the body 12 and which are connected to the pipeline wall via bristles 20 to complete the magnetic circuits in the pipeline.

FIG. 1 also shows that the vehicle 10 has resilient seals 22 extending therefrom which will abut against the internal surface of the pipe and act as a pressure surface for driving the pipeline pig through the pipe.

Figure 2:
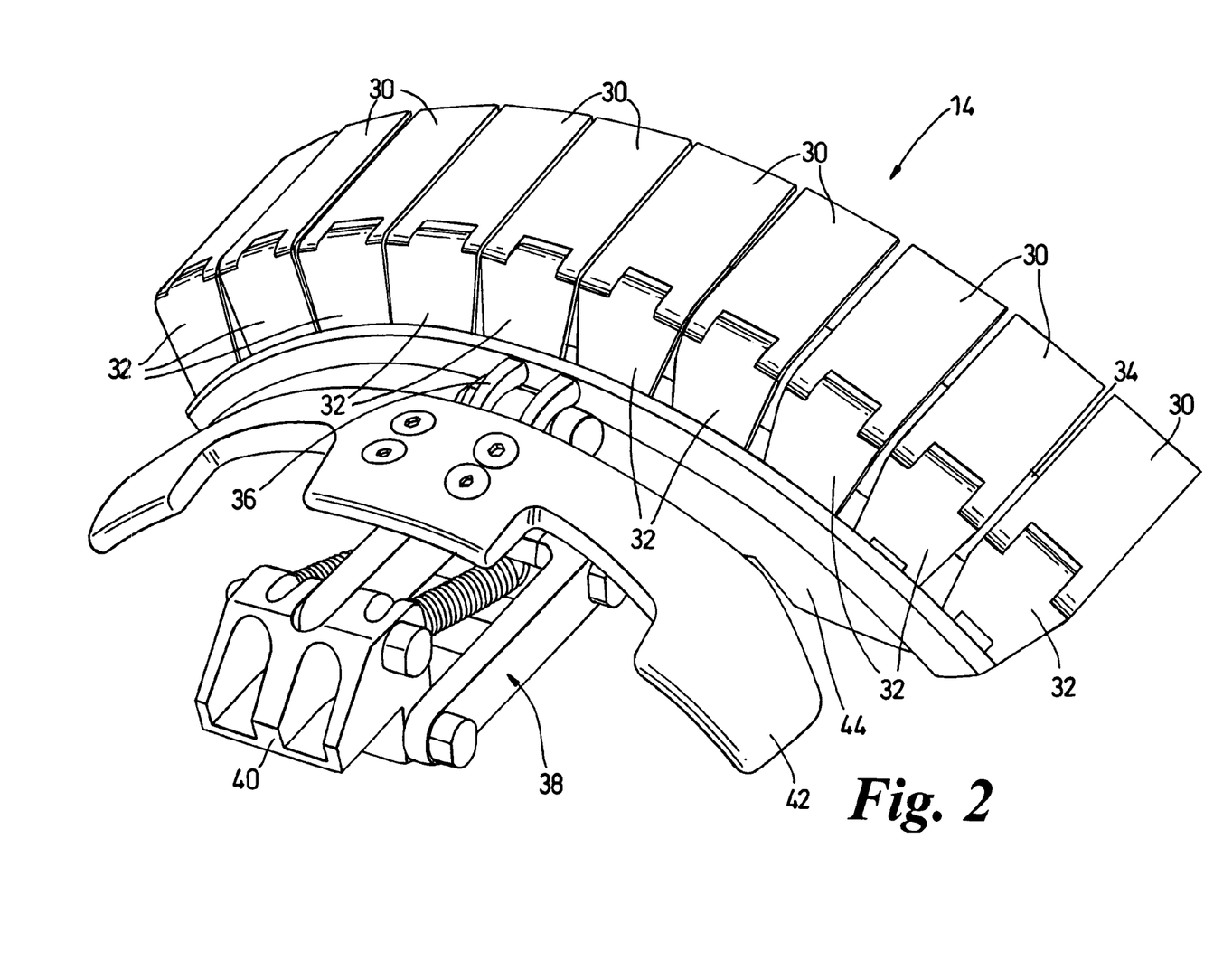
FIG. 2 is the perspective view of the embodiment of the sensor module.

Referring now to FIG. 2, the sensor module comprises a plurality of sensors 30 connected via respective linkages 32 to a sensor carrier 34. Note that the sensor carrier 34 is largely hidden by the sensors 30 and linkages 32 in FIG. 2. The sensor carrier is mounted on a bracket 36 which is connected via a linkage 38 to a further bracket 40, by which bracket 40 the sensor module 14 is mounted on the body 12 of the vehicle 10 in FIG. 1.

FIG. 2 also shows that the sensor module has an elongate deflector 42 which is mounted so that it is in front of the sensors 30 when the vehicle 10 is moving along the pipeline in its normal direction and is movable radially in dependence on the diameter of the pipe. It will contact the interior of the pipeline if the diameter of the pipeline decreases significantly, to enable the sensor module 14 to move radially inwardly. The deflector 42 thus acts as protection for the sensors 30, to prevent those sensors 30 being damaged by impact with the interior wall of the pipeline at sudden changes in the diameter thereof.

It can been seen that the sensor carrier 34 forms a part cylindrical body, so that the sensors 30 are positioned along an arc of a circle which will normally be centred on the centre of the pipeline. Similarly, the deflector 42 is curved to conform generally to the pipeline, although the fact that the sector 42 needs to be rigid means that it is likely to have a smaller radius of curvature than the sensor carrier, when the apparatus is operating normally. Since the protector 42 is only needed when there is a sudden decrease in the diameter of the pipeline, its radius of curvature will preferably conform to the smallest pipeline diameter likely to be encountered. FIG. 2 also shows that a fixed deflector 44 is mounted on the bracket 36 between the moveable deflector 42 and the sensor carrier 34. This provides further protection for the leading edge of the sensor carrier 34.

Figure 3:
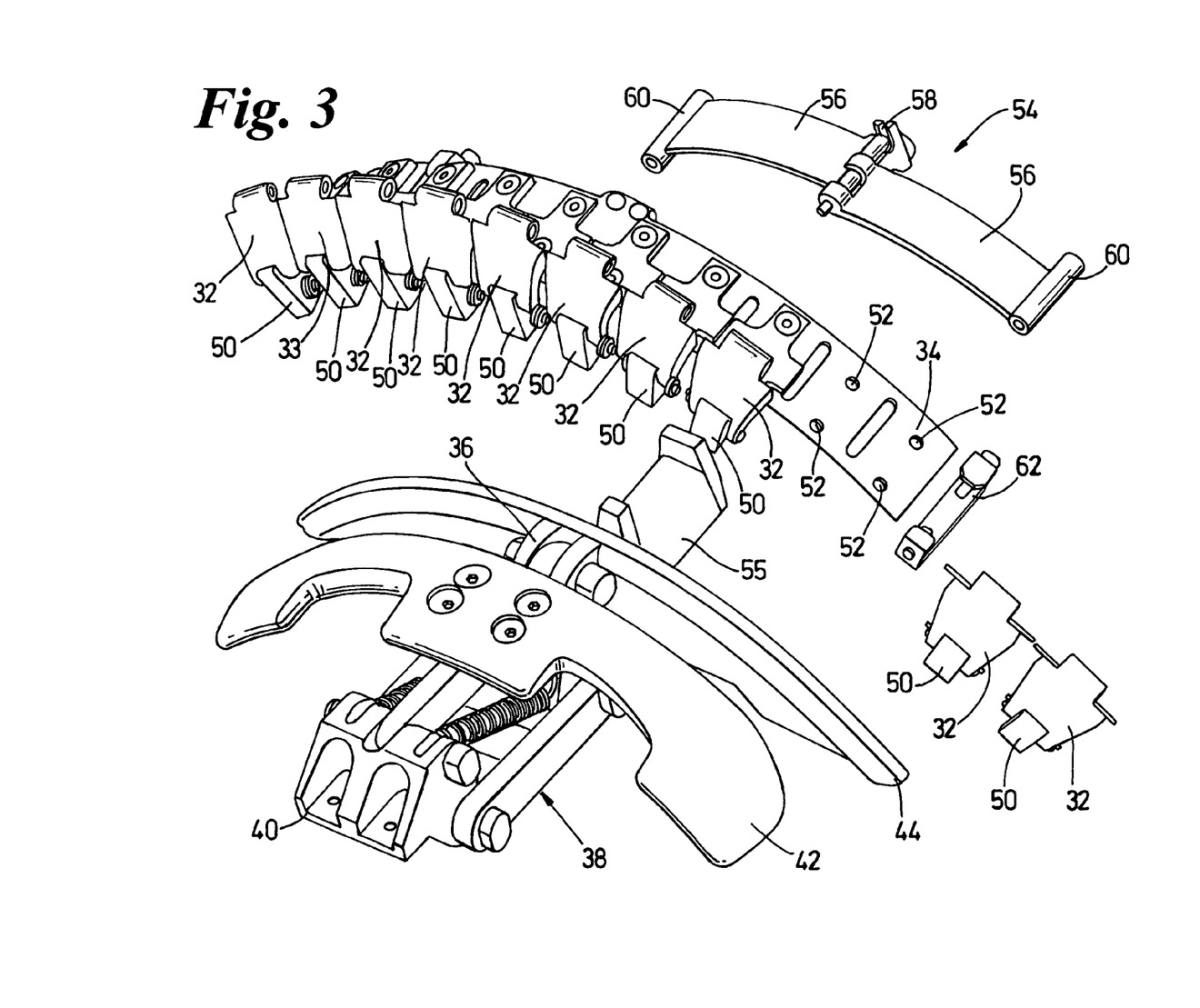
FIG. 3 is an exploded view of the sensor modules.

As was mentioned above, the sensor carrier 34 comprises a plate which is curved about an axis which will normally conform to the central axis the pipeline, the sensors 30 are omitted from FIG. 3, for the sake of clarity, but it can been seen that the sensor linkages 32 are connected by a respective brackets 50 which are fixed to the sensor carrier 34. Note that two of the sensor linkages are detached in the exploded view of FIG. 3, to enable the mounting holes 52 for the brackets 50 to be visible.

FIG. 3 also shows that the sensor module 14 has a bracing unit formed by torsional brace 54 which is mounted on a bracket 55, fixed to the bracket 36 which carries the sensor carrier 34. The torsional brace 54 will be described in more detail later, but comprises two control arms 56 connected together at a central hinge 58, and terminating in fixings 60. Those fixings 60 support a clip 62 by which the free ends of the control arms 56 engage the sensor carrier 34.

Figure 4:
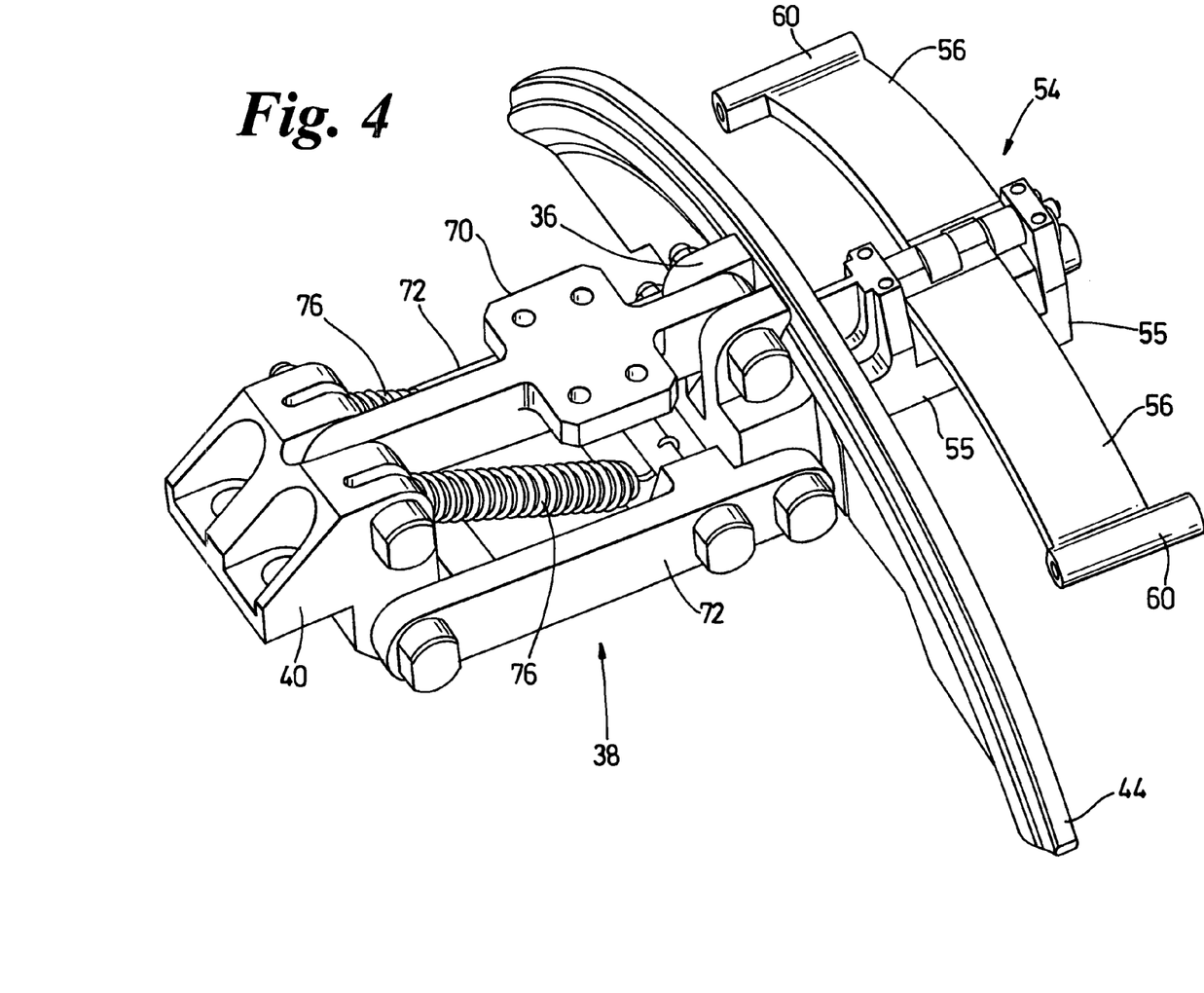
FIG. 4 shows the structure for mounting the sensor module on the pipeline pig.
Figure 5:
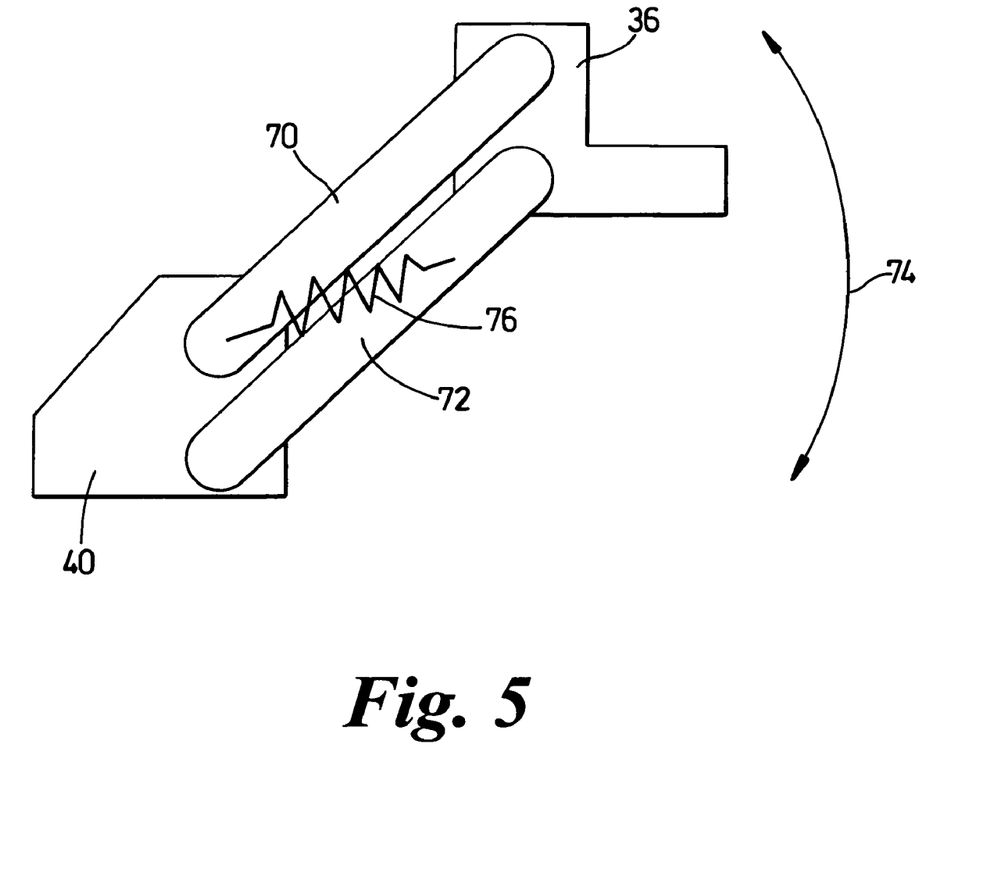
FIG. 5 shows a linkage in such mounting.

FIG. 4 illustrates the mounting of the torsional brace 54 on the bracket 55, and also shows in more detail the linkage 38 by which the bracket 36 to which the sensor 34 is connected to the bracket 40 by which the sensor module is mounted on the body 12 of the vehicle 10. In particular, that linkage 38 comprises an upper arm 70 and a pair of lower arms 72 connected between the brackets 36, 40. As illustrated in FIG. 5, the arrangement of the arms, 70, 72 is to form a parallelogram linkage between the brackets 36 and 40 so that the bracket 36 is maintained in a fixed orientation relative to the bracket 40 as it moves radially of the body 12 of the vehicle 10, as illustrated by arrow 74.

Extension springs 76 are provided between the arms 70, 72 which tend to bias those arms upwardly, as shown in FIG. 5. Thus, the bracket 36, and hence the sensor module 14 is normally held in an outer most position due to the extension springs 76, but if the diameter of the pipeline changes, the sensor module 14 will be moved radially inwardly, against the force of the extension springs 76. If the change represents a permanent change in the diameter of the pipe (because the vehicle 10 has moved from one pipeline region to another of different diameter), the sensor module 14 will then be maintained adjacent to the wall of the pipe. If there is a sudden, but temporary change in the diameter of the pipe, e.g. due to a local deformation of the pipe, the impact of that deformation with the protectors 42 and 44 will move the sensor module 14 radially inwardly, but the extension springs 76 will then return it to its normal position once the projection has passed.

In the present embodiment, the sensor carrier 34 is in the form of a flexible leaf spring, to permit its radius of curvature to change resiliently. Thus, the sensor module 14 can conform to changes in the diameter of the pipeline, at least over a suitable range, and thus allow the vehicle 10 to be used with the range of pipelines. The flexing of the sensor carrier 34, in a way which changes its radius of curvature, changes the radius of the arc defined by the sensors 30, and thus maintains those sensors adjacent to the internal wall of the pipeline. Since the sensor carrier 34 is a leaf spring, its springing biases it so that it conforms to the radius of the pipeline. Secondly, it needs to be braced to stop it twisting under torsion, in a way which would cause it no longer to conform to a part cylindrical body. This is achieved by the torsional brace unit 54.

Figure 6:
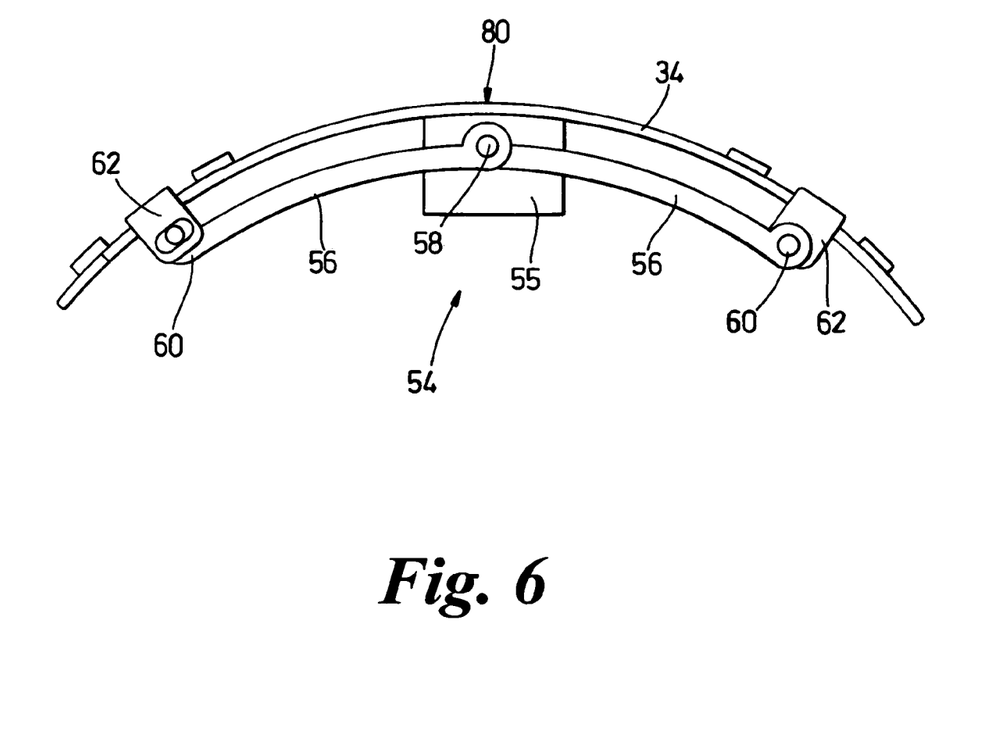
FIG. 6 illustrates the connection of the sensor carrier and bracing unit.
Figure 7:
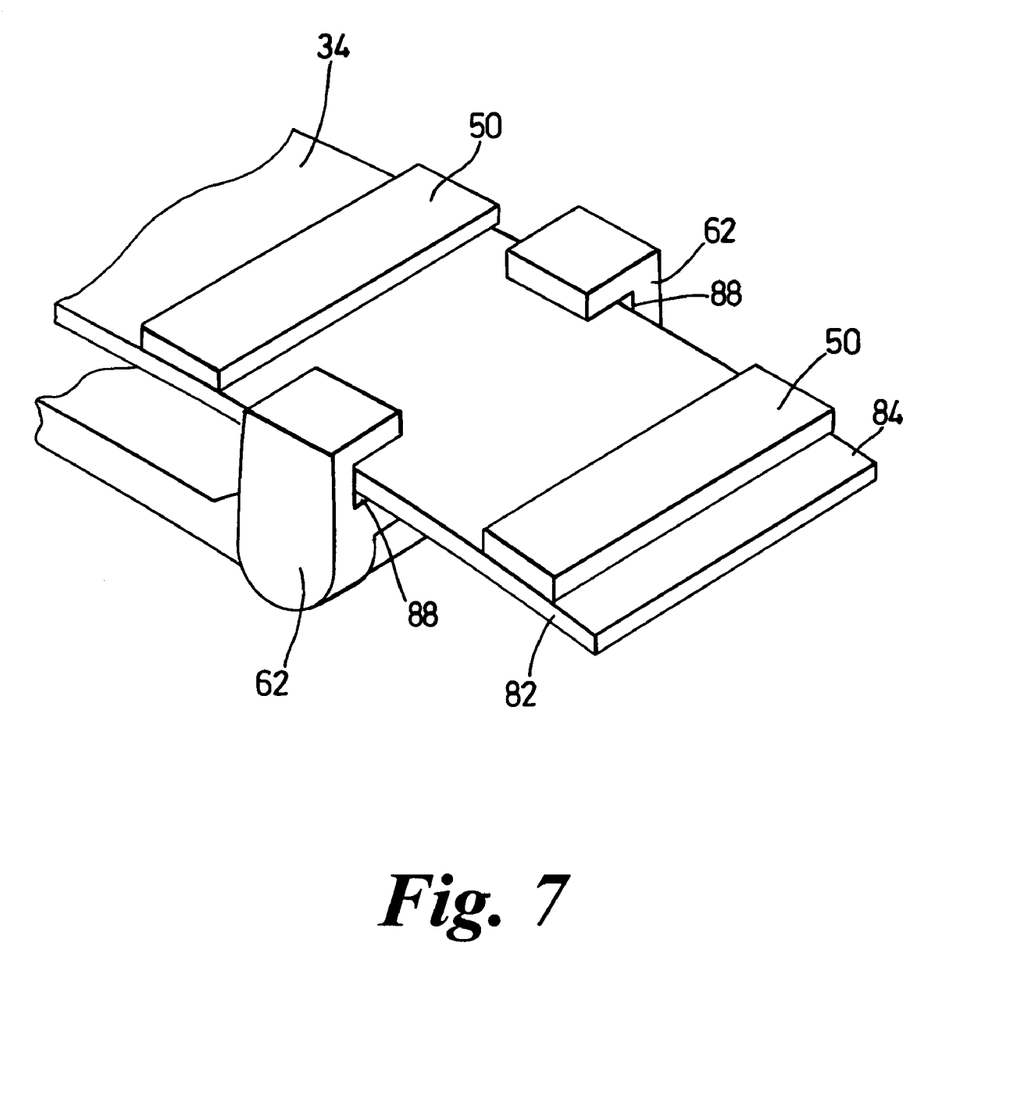
FIG. 7 shows a detail of the engagement of the sensor carrier and bracing unit.

Thus, as shown in FIG. 6, the torsional brace 54 is mounted below the sensor carrier 34, and the fixing of the bracket 55 relative to the bracket 36 means that the central hinge 58 of the control arms 56 is fixed relative to the centre 80 of the sensor carrier 34. On the other hand, the clips 62 which are connected to the control arms 56 via the fixings 60 are not fixed to the sensor carrier but are able to slide relative thereto. As shown in FIG. 7, the clips 62 engage the leading and trailing surfaces 82, 84 of the sensor carrier 34 between a pair of brackets 50 which act as stops. The clip 62 has slots 88 therein, in to which the surfaces 82, 84 are received. Thus, the clips 62 engage the sensor carrier 34, but are not fixed to it. The clips 62 can slide along the surfaces, 82, 84, at least until the brackets 50 are reached. Hence, the control arms 56 provide no load on the sensor carrier 34 and therefore have no effect on the radius of curvature of the sensor carrier but only act to remove torsional effect on the sensor carrier 34.

Thus, the sensor carrier 34 is biased outwardly due to its inherent resilience, but if the sensor carrier 34 has to flex, to conform to changes in pipeline diameter, the clips 62 can slide along the surfaces 82, 84 to a different position, to allow the sensor carrier 34 to adopt a different curvature. The torsional brace 54 thus braces the peripheral parts of the sensor carrier 34, where those peripheral parts are engaged by the clips 62, but permits variations in curvature.

Moreover, since the clips 62 engage the leading and trailing surfaces 82, 84, the sensor carrier 34 cannot twist under torsion at it peripheral. Any torsion of the sensor carrier 34 (such as to take its surface out of parallel with the axis of curvature), would twist clips 62 relative to each other, and so would twist the control arms 56. Those control arms, because of their rigidity, will resist such twisting and thus restore the peripheral parts of the sensor carrier 34 to the correct alignment.

Thus, the bracing unit maintains the sensor carrier 34 in position such that the shape of the sensor carrier 34 conforms to a part-cylinder, the radius of curvature of which is such as to maintain the sensors 34 adjacent to the inner wall of the pipeline, in respect of variations in diameter of that pipeline. The resilience of the sensor carrier 34 biases the sensor carrier 34 towards a diameter larger than the pipeline, so that the lateral edges of the sensor carrier are deformed inwardly by the pipeline itself, so that the curvature of the sensor carrier is appropriate for a given pipeline diameter.

Figure 8:
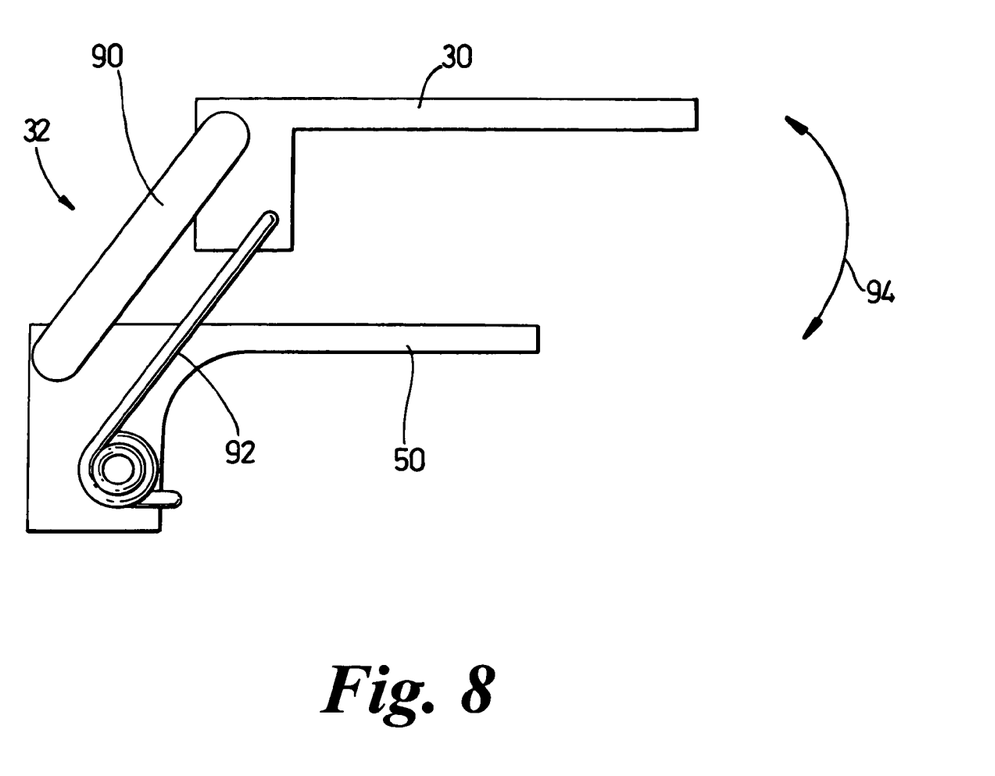
FIG. 8 illustrates the mounting of the sensors on the sensor carrier.

It should be noted that the sensors 30 may themselves be movable radially relative to the sensor carrier 34. This is illustrated in FIG. 8, which shows that the linkage 32 by which the sensor 30 is connected to the bracket 50, which bracket 50 is itself fixed to the sensor carrier 34, these formed by parallelogram linkage comprising an arm 90 and a parallel spring 92. The ends of the arm 90 are connected between the sensor 30 and the bracket 50, as are respective ends of the spring 92. Thus, the spring 92 tends to bias the sensor 30 upwardly in FIG. 7, but the sensor 30 may move relative to the fixing 50 e.g. due to the local deformations in the pipe as illustrated by arrow 94. The linkage 32 ensures that the sensor 30 always remains parallel to the bracket 50 and hence the curvature of the pipe.

Thus, the linkage 32 permits the sensors to adapt to variances in the pipe, such as localised features, but if those features were sufficiently large, in a way which could damage the sensors 30, the whole of the sensor module 14 will be moved away from the pipeline wall due to impact of the feature with the protectors 42, 44. On the other hand, if the diameter of the pipeline changes, due to movement of the vehicle 10 from 1 pipeline region to another, such change in diameter can be compensated for by flexing of the sensor carrier 34, so that the arc defined by the sensors 30 changes in radius. Movement of the sensor carrier 34 by flexing of the sensor carrier 34, so that the arc defined by the sensors 30 changes in radius. Any torsional force transmitted to the sensor carrier 34 is then controlled by the torsional braces 54, to ensure that the curvature of the sensor carrier 34 is appropriate for the pipeline, and that the sensor carrier 34 does not twist under torsion. Thus, an adaptable sensor arrangement is provided, to allow the pipeline pig to be used in a range of pipeline geometries.

What is claimed is:

1. A sensor module for an in-line pipe inspection tool, comprising:
    a sensor carrier carrying a plurality of sensors, the sensor carrier having a shape corresponding to a part of a circumference of a cylinder, and being resiliently flexible such that the radius of curvature relative to the central axis of the cylinder, is variable; and
    a bracing unit fixed to a first part of the sensor carrier and engaging a further part or parts of the sensor carrier, the further part or parts being circumferentially spaced from said first part of the sensor carrier to which the bracing unit is fixed, the engagement of the further part or parts being such as to resist deformation of the further part or parts of the sensor carrier such as would cause a surface of the further or parts of said sensor carrier to be inclined relative to the central axis of the cylinder.

2. A sensor module according to claim 1 wherein the bracing unit is fixed to a central part of the sensor carrier and engages two parts of the sensor carrier respectively on appropriate sides of that central part of the sensor carrier.

3. A sensor module according to claim 2, wherein said two parts are at, adjacent or towards the lateral edges of said sensor carrier.

4. A sensor module according to claim 1, wherein the bracing unit is adapted to deform to conform to the radius of curvature of the sensor carrier.

5. A sensor module according to claim 4, wherein the bracing unit comprises bracing parts hingedly connected together.

6. A sensor module according to claim 1, wherein the bracing unit engages the sensor carrier at its leading and trailing edges.

7. A sensor module according to claim 6, wherein said engagement of said bracing unit and said sensor carrier is a sliding engagement.

8. An in-line pipe inspection tool having a sensor module, said sensor module comprising:
    a sensor carrier carrying a plurality of sensors, the sensor carrier having a shape corresponding to a part of a circumference of a cylinder, and being resiliently flexible such that the radius of curvature relative to the central axis of the cylinder, is variable; and
    a bracing unit fixed to a first part of the sensor carrier and engaging a further part or parts of the sensor carrier, the further part or parts being circumferentially spaced from said first part of the sensor carrier to which the bracing unit is fixed, the engagement of the further part or parts being such as to resist deformation of the further part or parts of the sensor carrier such as would cause a surface of the further part or parts of said sensor carrier to be inclined relative to the central axis of the cylinder.

9. An in-line pipe inspection tool according to claim 8, wherein said sensor module is connected to the body of the tool via a deformable linkage, said linkage permitting said sensor module to move radially relative to said body.

10. An in-line pipe inspection tool having a plurality of sensor modules arranged circumferentially around the body of the tool, each of said plurality of sensor module comprising;
  a sensor carrier carrying a plurality of sensors, the sensor carrier having a shape corresponding to a part of a circumference of a cylinder, and being resiliently flexible such that the radius of curvature relative to the central axis of the cylinder, is variable; and
  a bracing unit fixed to a first part of the sensor carrier and engaging a further part or parts of the sensor carrier, the further part or parts being circumferentially spaced from said first part of the sensor carrier to which the bracing unit is fixed, the engagement of the further part or parts being such as to resist deformation of the further part or parts of the sensor carrier such as would cause a surface of the further part or parts of said sensor carrier to be inclined relative to the central axis of the cylinder.

11. A sensor module for an in-line pipe inspection tool, comprising:
  a sensor carrier carrying a plurality of sensors, the sensor carrier having a shape corresponding to a part of a circumference of a cylinder, and being resiliently flexible such that the radius of curvature relative to the central axis of the cylinder, is variable;
  a bracing unit fixed to a part of the sensor carrier and engaging at least one other part of the sensor carrier, the engagement being such as to resist deformation of said other part of the sensor carrier, which deformation is such as to cause the surface of said other part of said sensor carrier to be inclined relative to the central axis of the cylinder; and
  the bracing unit being fixed to a central part of the sensor carrier and engaging two parts of the sensor carrier respectively on appropriate sides of that central part of the sensor carrier.

12. A sensor module for an in-line pipe inspection tool, comprising:
  a sensor carrier carrying a plurality of sensors, the sensor carrier having a shape corresponding to a part of a circumference of a cylinder, and being resiliently flexible such that the radius of curvature relative to the central axis of the cylinder, is variable;
  a bracing unit fixed to a part of the sensor carrier and engaging at least one other part of the sensor carrier, the engagement being such as to resist deformation of said other part of the sensor carrier, which deformation is such as to cause the surface of said other part of said sensor carrier to be inclined relative to the central axis of the cylinder; and
  the bracing unit comprising bracing parts hingedly connected together.

13. An in-line pipe inspection tool having a sensor module, said sensor module comprising:
  a sensor carrier carrying a plurality of sensors, the sensor carrier having a shape corresponding to a part of a circumference of a cylinder, and being resiliently flexible such that the radius of curvature relative to the central axis of the cylinder, is variable; and being resiliently flexible such that the radius of curvature relative to the central axis of the cylinder, is variable;
  a bracing unit fixed to a part of the sensor carrier and engaging at least one other part of the sensor carrier, the engagement being such as to resist deformation of said other part of the sensor carrier, which deformation is such as to cause the surface of said other part of said sensor carrier to be inclined relative to the central axis of the cylinder; and
  said sensor module being connected to the body of the tool via a deformable linkage, said linkage permitting said sensor module to move radially relative to said body.

* * * * *